Figure 1:
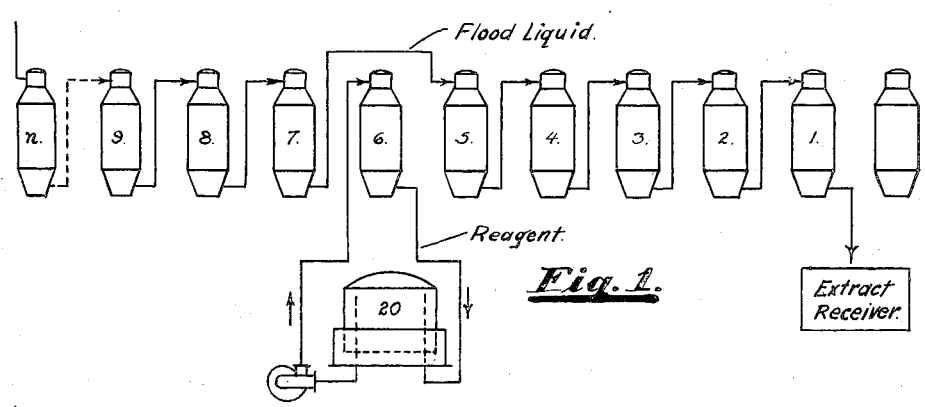

Feb. 6, 1940.   M. J. PROFFITT   2,188,919
APPLICATION OF REAGENTS IN COUNTERCURRENT EXTRACTION
Filed March 29, 1939

Max J. Proffitt,
INVENTOR
BY
ATTORNEY

Patented Feb. 6, 1940

2,188,919

UNITED STATES PATENT OFFICE 2,188,919

APPLICATION OF REAGENTS IN COUNTERCURRENT EXTRACTION

Max J. Proffitt, Washington, D. C., assignor to the Government of the United States of America, as represented by the Secretary of Commerce and his successors Application March 29, 1939, Serial No. 264,744

5 Claims. (Cl. 23—268)

(Granted under the act of March 3, 1883, as amended April 30, 1928; 370 O. G. 757)

The invention herein described may be practiced and used by or for the Government of the United States for Governmental purposes without payment of any royalty thereon.

The invention relates to the extraction or leaching of soluble substances from solid or semisolid materials with which they are associated either naturally or artificially. More particularly the invention relates to any such process conducted on the countercurrent principle, in which the solvent is a liquid which is introduced either continuously or intermittently, and in which the particles of the fresh extractives-bearing material are introduced either continuously or intermittently as in separate batches or charges. For example, the invention can be applied advantageously to the extraction of levulose, or substances such as polysaccharides which yield levulose upon hydrolysis, from cossettes prepared from suitable vegetable tissues and contained in the cells of a diffusion battery. It can be used in the leaching of other substances in devices of similar general effect although known by other names; but I do not wish to confine the use of my invention to any particular form of apparatus or to any specific solvent or extractives-bearing material. For convenience, the latter will be referred to hereinafter as the "particles"; aggregates comprising solvent and the said particles in any stage of the process will be referred to collectively as "material in process"; and the entering solvent and particles, when considered together in respect of the process as a whole, will be referred to as the "fresh materials."

Specifically the present invention has to do with the dosage of the material in process by the introduction of a reagent or a plurality of reagents within a region intermediate between the solvent inlet and the extract outlet. Heretofore when reagents have been employed in processes of countercurrent extraction they have generally been introduced by way of the fresh materials and not by way of the material in process where interchange of substance between the particles and the surrounding liquid is considerably active.

When introduced with the fresh particles either as a constituent of the priming liquid with which the particles are flooded preparatory to the initiation of the process proper, or as a deposit upon or admixture with the particles prior to application of the priming liquid, a reagent can attain an effective concentration but very briefly, since a large portion of it is carried away immediately by the effluent extract. Moreover the highest concentration of reagent occurs in a region where interchange of substance between particles and liquid ordinarily is extremely slow, hence but little penetration of reagent into the particles can result. The chief advantage of this method of reagent dosage is that soluble reagents and their soluble products are reduced to a minimum in the residues remaining at the termination of the process.

On the other hand when reagent is introduced as a constituent of the fresh solvent a prolonged duration of effective concentration can be attained, but usually at the expense of great waste of reagent and contamination of the residues; for the highest concentration of reagent in such a method must occur in the residues. In nearly every case where the application of a reagent is indicated an extensive duration of effective concentration is required, either to permit the requisite penetration of the reagent into the particles or to prolong the action of the reagent upon the surfaces of the particles, or else to sustain the desired conditions in the materials in process. Most reagents are too expensive to be discarded uselessly in the residues. Many residues from processes of countercurrent extraction are either primary products or valuable byproducts which would be rendered unfit for consumption to economic advantage by the presence of considerable quantities of reagent in their composition.

One can summarize by saying that each method of reagent dosage generally used heretofore in processes of countercurrent extraction has its peculiar advantages together with nearly prohibitive drawbacks. As a result reagent dosage has not been practiced extensively in such processes. In my present method of dosage, however, a prolonged duration of effective concentration of reagent is obtained together with a minimizing of the quantities of reagent remaining in the residues, a result which is not possible with prior methods.

As an example of the purposes of reagent dosage in processes of countercurrent extraction, I mention the hardening of the tissues or the marc where the particles comprise organic materials and where such hardening is indicated for improving or for retaining more completely the permeability of the mass of particles to the transfusion of the liquids surrounding the particles during the course of the extraction process. As an instance of this I can cite the action of formaldehyde or a solution of a suitable metallic salt on the tissues of certain organic substances. Another example is the suppression of fermentation and putrefaction of the material in process through the action of such reagents as sulphur dioxide, sodium benzoate, formaldehyde or an acid or alkali. The fixing and rendering less soluble or dispersive of a particular constituent or class of constituents of the particles in order to favor their retention with the final residues when their presence in the extract would be undesirable, may be cited as a third example. A fourth example is the maintenance of conditions which are favorable to the solubility of substances to be removed as extractives. Of the numerous other examples which might be cited, one should suffice; namely, the maintenance of conditions favorable to the chemical stability of valuable constituents of either the extractives or the residues.

Several purposes may be served by the introduction of a single reagent; thus dosage with an acid might produce all of the effects cited above as examples, hardening the tissues by coagulating albumins, retarding dispersion of colloids by maintaining a suitable isoelectric point, suppressing fermentation and putrefaction by maintaining hydrogen ion concentrations unfavorable to organic growth and promoting the solubility of certain constituents of the extractives and favoring the chemical stability of others by maintaining a suitable range of pH values in the material in process. But I do not wish to limit the application of my invention to any single reagent; or to any particular point or means of introducing reagent dosage. My invention is distinguished rather by the general region of the process in which the said dosage is applied and in the mode of applying the same. These factors can be defined best after considering certain features of countercurrent processes in general.

Any form of suitable apparatus together with the whole of the material contained in it at any instant during the operation of a process of countercurrent extraction may be considered an extraction column. Such a column may be disposed in any position required by the particular form of the apparatus from vertical to horizontal, and it may comprise any number of containers according to the purpose of the process and the form of the apparatus, including a single cell as well as a series of multiple containers operating as a single unit in respect of the process as a whole. In any case the solvent enters at the head of the column and the extract is withdrawn at the foot or near the foot of the column; while the fresh particles enter the column at the foot and their spent residues leave the column at the head. In a multiple container apparatus such as a diffusion battery, where the particles are introduced as discrete charges each comprising the particles in one container, the total number of containers in the whole apparatus is divided into two groups. One group includes the containers which temporarily are out of service for the purpose of emptying, cleaning and recharging, first with fresh particles and finally with priming liquid. The other group includes all of the containers in which the process of extraction actually is proceeding, therefore only the containers in service.

The containers in service may comprise either a single extraction column, or a plurality of extraction columns each conforming with the description above. Each charge of particles and its container occupy successive "postures" in the column of which they are a part during the whole term of the processing of that charge. They start in the first posture at the foot of the column and finish in the $n$th posture at the head of the column, where $n$ stands for the number of containers in that particular column. Thus $n$ stands also for the number of "operating periods" in the whole term of processing used in that column when an operating period is the recurrent interval of time between the introduction of successive charges and therefore the interval of time between successive movements of the extraction column along the battery of containers.

Solvent in contact with the particles in any posture of the column, and that in transit between any two containers of the column, will be called "flood liquid". Once any part of the flood liquid has attained its final concentration of extractives through contact with the particles and is withdrawn finally from the system, it will be called "extract". Thus flood liquid is solvent in process of becoming extract. Liquid inside the particles and containing extractives in any degree of concentration from that existing in the original particles to that existing in the most completely spent residue will be called "sap", even though the fresh particles are not of organic origin. Those skilled in the art of countercurrent extraction will perceive that nearly all of the features named above are inherent in all processes of countercurrent extraction, whatever the form of the apparatus in which they are conducted. The exceptions will be apparent. For example, where the input of the solvent and the input of the particles are both continuous the operating periods will be merged into continuity. Where the apparatus comprises but a single container the idea of successive postures is less applicable than a concept of the gradual advancement of the particles in a flow-wise manner through the whole length of the extraction column. This advancement can be described as unit progress of particles through unit length of apparatus during unit time of processing of the particles.

As suggested above, in carrying out my invention I introduce reagent to the material in process within a region intermediate between the head and the foot of the extraction column. Generally I prefer to apply the dosage at a point approximately half way between the solvent inlet and the extract outlet, but when conditions indicate I can apply the dosage at some other point, and even at a plurality of points, within the region specified. The said plurality of points may be distributed along a section of the column comprising a substantial part of the total column. The said section may be disposed more or less medially between the solvent inlet and the extract outlet. Depending upon the particular purposes, means and effects of the specific reagent treatment, however, the said section may be operated in a manner such as to keep it nearer the solvent inlet, or conversely, near the extract outlet. In any case the reagent dosage may comprise either a single reagent or a plurality of reagents. A method of accomplishing these ends when dealing with a reagent miscible with the flood liquid is disclosed in my paper entitled "Design and construction of an experimental diffusion battery", National Bureau of Standards Research Paper R. P. 840, in which I show how to introduce the reagent directly to the flood liquid at one or more intermediate points in the column. In that case the reagent must be miscible with the flood liquid and is diluted thereby before being transmitted indirectly to the particles with which the said reagent-treated flood liquid comes in contact.

The present invention, however, enables the use of reagents which are non-miscible, as well as miscible, with the flood liquid, and provides for treating the particles with the reagents substantially undiluted with flood liquid, enabling more rapid, convenient, and economical treatment and, when using non-miscible reagents or reagents which react with the partially extracted particles to form substances relatively non-miscible with the flood liquid, enabling virtual elimination of reagents from the extract.

In accordance with the present invention the reagent is applied to the particles alone, as, for example, while the flood liquid is locally and temporarily removed from contact with them.

Regardless of the particular phase or mixture of phases of material to which the reagent dosage is directly applied in carrying out my invention, both the flood liquid and the particles attain their greatest concentration of reagent during the course of their interaction and not, as in prior methods, only when the activity of one phase is nearly spent and the activity of the other phase is not more than begun. Moreover, the said greatest concentration is a result, not of the dosage alone, but of the dosage in combination with the interchange of reagent between the phases of the material in process. With respect to the particles traversing the process as a whole, the transfer of any reagent carried by the flood liquid is first "inward" from the flood liquid to the sap and, since this direction of interchange continues during a substantial part of the term of processing, it has the effect of recycling a substantial quantity of reagent forward and backward to the region of the dosage application. Thus it reduces the quantity of reagent carried out of the reaction column by the extract (as well as by the particles) during unit time, relative to the quantity of reagent contained in the column at any instant. Finally, after the sap in the particles has attained a maximum concentration of reagent, and during all of the remainder of the term of processing, the net transfer of any miscible reagent is "outward" from the sap into the flood liquid and therefore concurrent with the transfer of original extractives. This interchange of reagent tends to proportion the concentration of reagent to the concentration of original extractives during the final part of the process. The reagent thus recovered from the residues of the process may be recycled to the region of reagent dosage application. Hence by means of my present invention relatively high concentrations of reagent can be maintained in the material in process with a relatively small consumption in reagent in the dosage, with relatively low or even no concentrations of reagent in the extract and with relatively little loss of reagent in the residues and therefore little contamination of the residues with reagent.

I can employ one or more means of reagent dosage of the particles; with or without additional, herein termed auxiliary, dosage of the reagent in accordance with the disclosure of my above mentioned paper, and I do not wish to limit in any way the types of means by which the auxiliary dosage may be applied. Where the flow of the dose-receiving material is continuous I prefer to apply the auxiliary dosage continuously, but I may apply it either continuously or intermittently in any case. As set forth in my above mentioned paper, to illustrate some of the means which I can employ for a substantially continuous dosage of material flowing approximately continuously, I need consider here only the introduction of fluid reagent into the flood liquid of an extraction column set up in a diffusion battery. As set forth in the above mentioned paper I can inject the said fluid reagent at a metered rate of flow into the successive battery cells which come to occupy a particular posture in the extraction column, or I can meter the reagent into the successive transfer ducts through which the current of flood liquid is passing between the cells occupying a particular pair of postures in the extraction column. As also set forth therein, I can introduce measured quantities of reagent in any phase desired, gaseous, liquid or solid, into flood liquid withdrawn from the effluent of each successive battery cell while the said cell occupies a particular posture in the extraction column, and then reintroduce the dosed flood liquid to the extraction column, either at approximately the same point in the battery as that from which that flood liquid originally was withdrawn, or at a different point in the battery where the concentration of extractives in the current flood liquid at the moment is similar to the concentration of extractives in the dosed flood liquid. I can repeat these operations at as many points along the extraction column as I desire. I can apply a similar dosage at every point, or I can vary the quantity and quality of the dosage as I choose in order to meet the existing conditions. Moreover, instead of injecting reagent into the whole or any part of the material in process in the specified region of the extraction column, or otherwise mixing reagent directly with the said material, I can cause reagent to be absorbed into any part of the said material through contact of the latter with a suitable phase of matter containing or generating the required reagent. For example, I can bring flood liquid into contact with a liquid, a solid or a gas containing the desired reagent; or after locally and temporarily separating the flood liquid from the particles in accordance with the present invention I can bring reagent-containing fluids into contact with the particles for a time, then displace the residual reagent fluid with flood liquid, and therewith resume the extraction process itself. In certain cases I can generate suitable reagents from the flood liquid by means of electrolysis. In accomplishing this I can bring the flood liquid into contact with electrodes situated within the extraction apparatus or placed externally to the extraction apparatus proper. In applying electrolysis of the flood liquid at any particular point in the column by the method of external treatment, the effluent flood liquid from each successive cell occupying a particular posture therein is transferred wholly or in part to the electrolytic apparatus, there subjected to the required electrolysis, preferably in a continuous manner, and then returned to the column in any of the ways outlined above for the return of reagent-treated flood liquid to the column. Again I can repeat the operations at as many points along the column as I desire and I can vary the degree of electrolysis among these points in any way that I choose just as in the case of other means of dosage.

Figure 2:
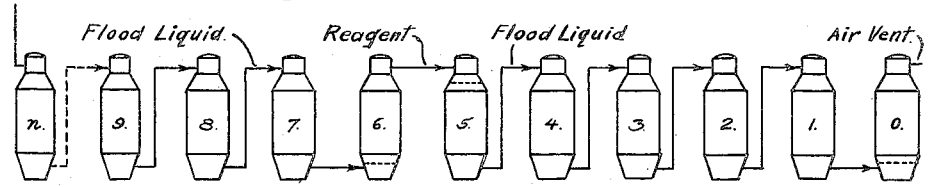
Figure 3:
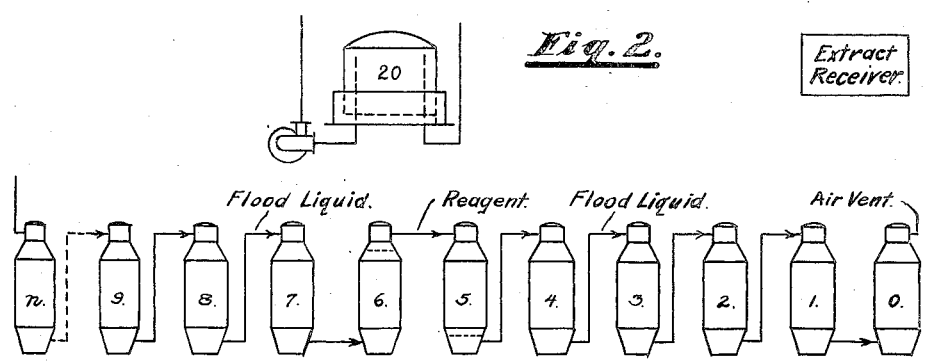

The illustrative embodiment shown in the drawing, in which Figs. 1, 2 and 3 represent three stages in the primary reagent dosage system of the present invention, comprises a diagrammatic side elevation of a 10-cell operating column of a diffusion battery, taken merely as an example of any form of countercurrent extraction column containing any number of cells or levels operated either continuously or intermittently. To indicate that the column may contain any plurality of cells, the cell in the final posture is numbered $n$, not 10.

The embodiment shown illustrates an arrangement in which the reagent is absorbed first by the particles and transferred secondarily (if at all) to the flood liquid. Reagent in a fluid form is brought into contact with the particles while the flood liquid is temporarily and locally (as for example, in a single cell of particles) removed from contact with the particles. The method of operation will vary somewhat, depending upon (1) whether the reagent fluid is liquid or gaseous and (2) whether, if liquid, the phase is immiscible with the flood liquid; (3) upon the relative densities of flood liquid and reagent fluid and (4) upon various other considerations. Assuming for simplicity that the reagent fluid is gaseous, Fig. 1 represents certain pertinent details of the column during the first part of each operating period when this means of reagent dosage is employed. The particles in a specific portion of the column, such as posture 6 for example, isolated from the rest of the column as by an appropriate setting of valves and freed of flood liquid by displacement with the gaseous reagent, are in process of absorbing their dosage of reagent, which may be merely surrounding them under suitable pressure or may be flowing among them in a circulatory course between their container 6 and the reagent supply unit 20 or in some other course. During this part of the period the flood liquid, by-passing posture 6, is flowing from the bottom of the cell in posture 7 to the top of the cell in posture 5 and as effluent from the bottom of the cell occupying posture 1 finally quits the column in the periodic draft of extract output. When the latter is complete and the periodic dosage also nearly sufficient, the arrangement of the column is changed to that represented in Figs. 2 and 3. During this second and final part of the period the effluent flood liquid from posture 7 passing into the bottom of the cell occupying posture 6 displaces the gaseous reagent into the top of the cell occupying posture 5. The incoming reagent displaces the flood liquid contained in the latter, forcing it from the bottom of this cell into the top of the cell occupying posture 4 and thus eventually from the bottom of the cell occupying posture 1 and into the bottom of the adjoining cell 0 to serve as "priming liquid" for that cell's newly charged particles. Since these particles are about to begin operating in the extraction column, the cell and charge occupy posture zero (0). Fig. 2 indicates the flood liquid levels in postures 6 and 5 and the priming liquid level in posture zero near the beginning of the said second part of any operating period; Fig. 3 the respective levels near the end of the period. If the residual reagent from posture 6 is insufficient to displace completely the flood liquid in the cell occupying posture 5, obviously the difference will be made up from the reagent supply unit 20 without interrupting the flux of flood liquid through the cells occupying postures of lower numerical order. Similarly any inequality between the volume of flood liquid required for priming the charge in posture zero and the volume of effluent from posture 1 due to the said displacement of flood liquid with reagent in posture 5 can be adjusted by suitably accelerating or delaying the start of the drawing of extract from the new charge relative to the completion of flood liquid displacement with reagent and the start of the by-passing of the reagent-filled cell by flood liquid. Neither of the two latter events need close an operating period, while the start of the drawing of extract from the newly primed cell does bring the cell into posture 1, steps up all the other cells in the column by one in numerical order of posture, and thereby opens a new operating period, as indicated in Fig. 1.

This description of one method of applying the reagent dosage directly to the particles during the course of their leaching by means of a gaseous reagent will serve to illustrate the direct dosage of the particles in course of leaching by any other means. Any method will comprise essentially (1) separation of the particles from the flood liquid, (2) application to the particles of reagent in suitable form, (3) allowing time for the absorption or other action of reagent, (4) separation of excess or residual reagent, and (5) return of flood liquid to the particles. Thus, if a reagent is used which is easily miscible with the flood liquid, the flood liquid may be displaced from the particles by air or any other suitable gas or other buffer fluid not deleteriously miscible with the flood liquid, either by gravity displacement, pumping, suction or otherwise. Then the displacing buffer-fluid may in turn be displaced by reagent, which may be left in contact with or circulated through the particles for an appropriate treating time. The reagent may in turn be displaced from the treated particles by buffer fluid, the replacement of which by flood liquid from the next ensuing level, will effect reintroduction of the particles to the extraction circuit.

The direct dosage of the particles in accordance with this invention, as above pointed out, has many advantages, important ones being that such dosage enables treatment of the particles with non-miscible reagents, as reagents in different physical phase from the flood liquid; enables treatment with greater concentration of reagent while effecting economy in the total quantity of reagent used; and effects marked saving in the concentrations of reagents in the extractions and residues. These and other advantages, it is clear, will be achieved whether this invention is employed alone or with auxiliary reagent treatments as above mentioned.

The invention is not limited to the particular embodiment disclosed to illustrate the same but comprises such variations thereof as fall within the reasonable scope of the appended claims.

I claim:

1. In a process of extraction comprising an input of solvent at the head of an extraction column counterwise to an input of material to be extracted, and in which the material is treated in several cells, the method which consists in charging a material carrying cell with flood liquid derived from near the extract-delivery end of a column of cells, advancing said cell with reference to the flow of flood liquid until it reaches a position intermediate the column, isolating the said material from the flow of flood liquid, treating said isolated material with a reagent while by-passing flood liquid from the next ensuing treating cell to the next preceding cell, removing excess treating reagent from the said material and reintroducing the treated material to the flow of flood liquid in the next succeeding stage of extraction.

2. In a countercurrent extraction process in which cells of material to be extracted are introduced at the foot of an extraction column and progressively advanced toward its head; while solvent is introduced at the head of the column and progressively flows as flood liquid toward the foot of the column, the method which consists in selecting a cell position at an intermediate point in the column for a reagent treating zone, introducing into the cell occupying the selected position a reagent substantially non-miscible with the flood liquid thus displacing the flood liquid therefrom to the cell next in order, treating the reagent-containing cell with reagent while by-passing it with flood liquid, redirecting flow of flood liquid into said cell to displace the reagent to the next cell to be reagent-treated, and continuing extraction of the treated material in the remaining cells of the column from the intermediate position to the head of the column.

3. In a countercurrent extraction process in which cells of material to be extracted are introduced at the foot of an extraction column and progressively advanced toward its head; while solvent is introduced at the head of the column and progressively flows as flood liquid toward the foot of the column, the method which consists in selecting a cell position at an intermediate point in the column for a reagent treating zone, displacing the flood liquid from the cell occupying the selected position to the next footwise cell and introducing treating reagent into the material thus isolated from flood liquid, by-passing flood liquid from the next headwise cell to the next footwise cell while the selected cell is being treated with reagent, and displacing the reagent from the selected cell and reintroducing thereto flood liquid from the next headwise cell, thus reintroducing the treated material to the extractive circuit.

4. A method according to claim 3, in which the recited displacements are effected by a buffer-fluid not deleteriously miscible with flood liquid, and itself displaced by the reagent and reintroduced flood liquid, respectively.

5. A method according to claim 3, in which the reagent is not deleteriously miscible with flood liquid and itself displaces and is displaced by flood liquid.

MAX J. PROFFITT.